J. SZCZUREK.
AIR OPENER FOR DOORS.
APPLICATION FILED FEB. 3, 1921.
1,382,143.
Patented June 21, 1921.
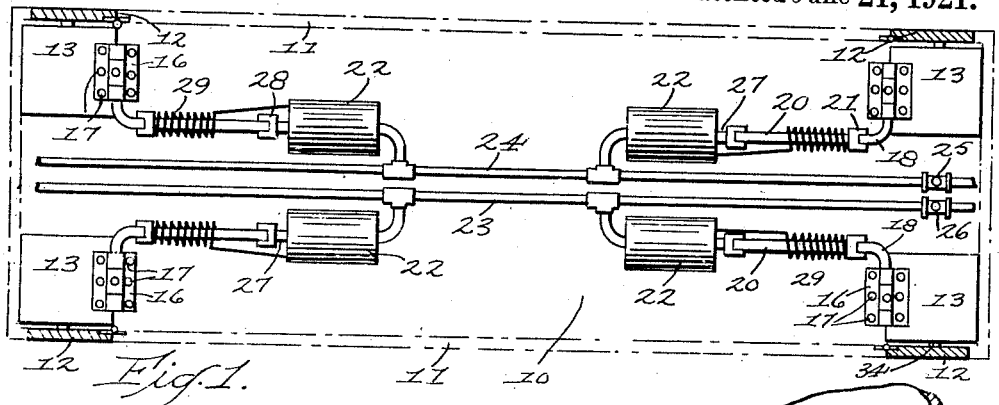
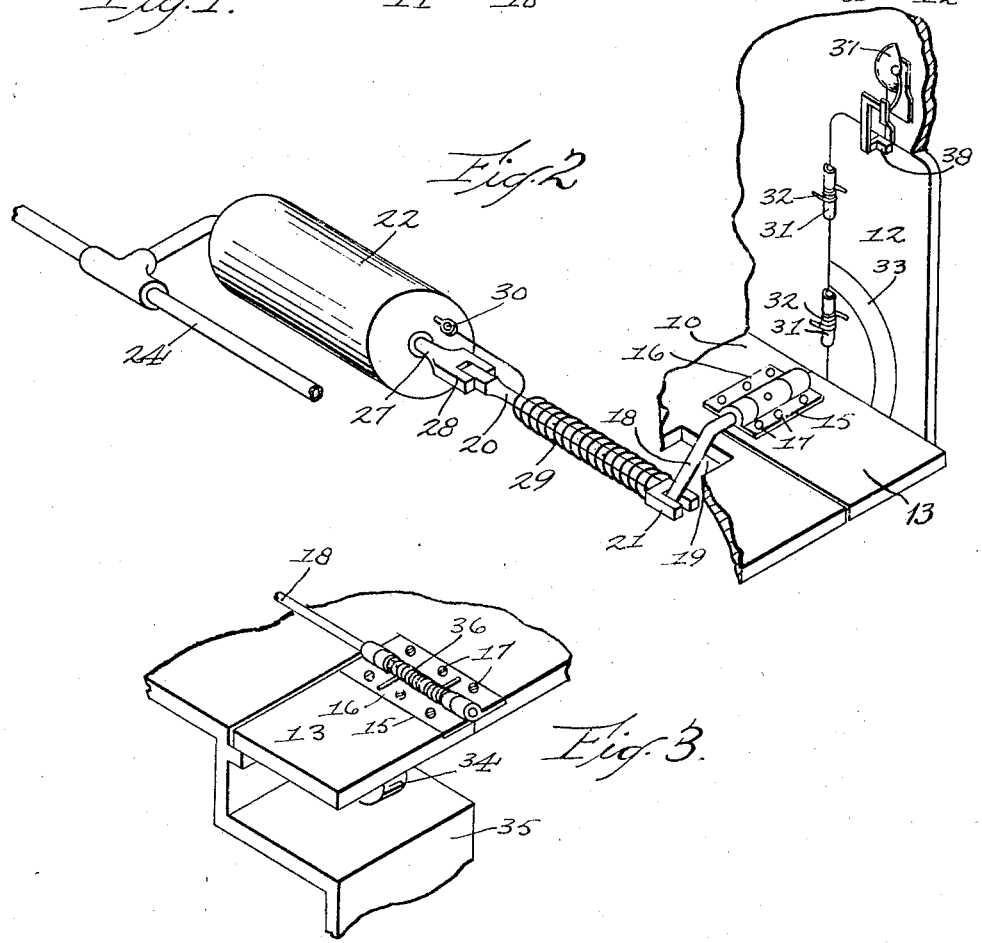
Inventor
Joseph Szczurek
By his Attorney
George C. Heinicke

UNITED STATES PATENT OFFICE.

JOSEPH SZCZUREK, OF CHICAGO HEIGHTS, ILLINOIS.

AIR-OPENER FOR DOORS.

1,382,143.     Specification of Letters Patent.     Patented June 21, 1921.

Application filed February 3, 1921. Serial No. 442,049.

*To all whom it may concern:*

Be it known that I, JOSEPH SZCZUREK, a citizen of Poland, residing at Chicago Heights, county of Cook, and State of Illinois, have invented certain new and useful Improvements in an Air-Opener for Doors, of which the following is a specification.

This invention relates to improvements in air openers for doors as for instance described in my Patent No. 1,338,882, dated May 4, 1920, and it is the principal object of my invention to provide a separate system for the operation of the doors and passenger car step covers of railway and other cars on each side of a car.

Another object of the invention is the provision of novel and improved means for automatically closing said door and placing the covers over the car steps after the air supply has been shut off.

A still further object of the invention is the provision of means whereby the closing operation of the step covers automatically produces a closing of the doors.

These and other objects of my invention will become more fully apparent as the description thereof proceeds, and will then be specifically pointed out in the appended claims.

In the accompanying drawing, forming a material part of this disclosure,

Figure 1 is a bottom plan view of a car equipped with a device constructed according to the present invention.

Fig. 2 is a fragmental perspective view of one of the air cylinders and the side door closed and step cover in position.

Fig. 3 is a fragmental perspective view showing the step cover, its support and a modified form of the operating means therefor.

Referring to the drawing in detail, the numeral 10 designates the bottom or floor of a passenger car in the side walls 11 of which are provided the doors 12. Step covers 13 are secured to the floor 10 by the hinge elements 15 and 16 attached by means of screws 17 or the like, and operated by the crank 18 constituting the hinge pintle.

The cranks 18 extend downwardly and pass through apertures 19 in the car floor, and are pivotally connected to the rods 20 by means of the forked heads 21.

Four cylinders 22, are secured to the car bottom, pairwise on each side of the center line of the bottom and the pair of cylinders on one side of the longitudinal center line is supplied with compressed air through a pipe 23, while the second pair of cylinders on the opposite side of the longitudinal center line is supplied with compressed air through a pipe 24.

Foot operated valves 25 and 26 control the supply of the air to said cylinders through the pipes 23 and 24. The air for this purpose is derived from a compression unit not shown in the drawing. Contained in the cylinders are pistons provided with rods 27 having secured upon their outer ends forked heads 28, with which they are connected to the bars 20.

A spring 29 is coiled around each bar 20 resting with one of its ends secured to the head 21, while its other straightened end is secured to eye 30 provided on the outer cylinder head plate.

The car doors 12 are connected to the car sides 11 by means of hinges 31, swinging inwardly from the sides after the upward movement of the hinged step cover 13, by the action of torsion springs 32 wound around pintles. A segmental guide 33 is provided on the face of the door along which the roller 34 of the step cover 13 is guided during the opening and closing movement, while upon the lowering of the step cover 13, it rests on top of the steps 35.

In Fig. 3 a modified form of the means for closing the step cover is illustrated according to which a strong spring 36 is wound around the pintle of the hinge elements so that, when the air is ceasing to operate the crank 18 to raise the cover, the same will automatically close down upon the steps.

In operation either of the foot operated air valves 25 or 26 controlling the admission of the compressed air to the cylinders is actuated to operate the pistons in either pair of cylinders on one side of the central line of the car bottom in order to operate the crank 18 to raise the step covers 13 on the respective side of a car, which operation will leave the doors 12 on the same side free to swing open under the action of the springs 32, while upon the release of the valves, the springs 29 or 36 will operate to close the step cover which during its descent will automatically close the door 12 by the engagement of its roller 34 with the guide 33 and the door will be held in its closed position by the step cover 13.

In order to sound an alarm upon the opening and closing of the door, a signal bell 37 of the usual spring operated bell-crank lever type is secured to the car side above the door and engages a catch 38, attached to the car door thereby operating the hammer of the bell 37 and sounding an alarm upon the opening and closing of the door.

Having thus described my invention, what I claim is new and desire to secure by Letters Patent, is:—

1. In a device for operating step covers and doors of passenger cars, the combination with a pair of doors on each side of the car hung on vertical axes, a pair of step covers, one for each of said doors, guide rollers on said covers to contact with said doors to open and close the same, a pair of air cylinders for each pair of step covers on one side of a car, means for supplying compressed air to said cylinders to operate said step covers, and means for automatically returning said step covers and doors into the original position upon the interruption of said air supply.

2. In a device of the character described in combination with the step covers and doors of a car, a pair of air cylinders for each set of step covers and doors on one side of the car, means for supplying compressed air to said cylinders, foot operated means for controlling the air supply, means connecting the pistons of said cylinders to the step covers, and a spring secured to each cylinder head, and to said connected means for automatically closing said step covers upon the interruption of said air supply, said doors being adapted to be closed upon the closing of said step covers.

3. A device of the character described comprising in combination with the step covers and car doors, hinges connecting said covers to the car bottom, a crank constituting the step cover hinge pintle, and extending through the car bottom, a rod having a forked head engaging said crank air cylinders for each pair of step covers on one side of a car, pistons in said cylinders, rods secured to said pistons and extending out of said cylinders for receiving between their forked ends the free end of said rod, a spring coiled around said rod fastened at one end to the forked head of the rod, and having its opposite free end secured to said cylinder head for returning said step covers into their closing position upon the interruption of the air supply to said cylinders, and means for transferring this closing motion of the step covers to said doors.

4. A device of the character described comprising a pair of step covers and vertical doors on each side of a passenger car, said doors normally held in their closed position by said step covers, a pair of compressed air cylinders for the step covers on each side of the car, means for connecting said covers and cyinders adapted to be operated upon the admission of compressed air into said cylinders for operating said covers, spring hinges for said doors for automatically opening the same upon their release by said step covers while opening the same, a roller on each of said step covers engaging a guide on the respective door during the opening and closing operation of the same, and a spring for guiding the parts back into their normal closing position.

In testimony whereof I have affixed my signature.

JOSEPH SZCZUREK.